United States Patent
Goldberg et al.

(10) Patent No.: US 9,023,181 B2
(45) Date of Patent: May 5, 2015

(54) FAST PYROLYSIS CATALYTIC CRACKING PIPE FOR PRODUCING BIO-OILS

(75) Inventors: Neil M. Goldberg, North Wales, PA (US); Michael F. Dallmer, Philadelphia, PA (US); Akswasi A. Boateng, Royersford, PA (US); Charles A. Mullen, Lansdale, PA (US); David J. Milhalcik, Philadelphia, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 1027 days.

(21) Appl. No.: 13/071,890

(22) Filed: Mar. 25, 2011

(65) Prior Publication Data

US 2012/0241305 A1 Sep. 27, 2012

(51) Int. Cl.
*C10B 53/02* (2006.01)
*B01J 8/02* (2006.01)
*C10K 3/02* (2006.01)
*C10B 49/02* (2006.01)
*C10B 57/18* (2006.01)

(52) U.S. Cl.
CPC .... C10K 3/02 (2013.01); B01J 8/02 (2013.01); C10B 49/02 (2013.01); C10B 53/02 (2013.01); C10B 57/18 (2013.01); *Y02E 50/14* (2013.01)

(58) Field of Classification Search
CPC .............. C10K 3/02; B01J 8/02; C10B 53/02
USPC ........................................................ 201/2.5
See application file for complete search history.

(56) References Cited

U.S. PATENT DOCUMENTS

| 669,812 | A | * | 3/1901 | Thierry et al. ................... 201/21 |
| 3,972,682 | A | * | 8/1976 | Stephens et al. ................. 422/78 |
| 4,308,411 | A | * | 12/1981 | Frankiewicz .................. 585/240 |
| 4,834,853 | A | | 5/1989 | Ethington et al. |
| 5,246,667 | A | * | 9/1993 | Hemzy et al. ................... 422/80 |
| 5,368,723 | A | * | 11/1994 | Takahashi et al. ............ 208/427 |
| 5,504,259 | A | * | 4/1996 | Diebold et al. ............... 568/697 |
| 6,844,420 | B1 | * | 1/2005 | Freel et al. ..................... 530/200 |
| 2002/0182128 | A1 | * | 12/2002 | Carnahan et al. ............. 422/188 |
| 2009/0054711 | A1 | * | 2/2009 | Lawrence et al. ............. 585/240 |
| 2009/0227766 | A1 | * | 9/2009 | Bridgwater et al. .......... 530/202 |
| 2010/0162625 | A1 | | 7/2010 | Mills |
| 2010/0163395 | A1 | | 7/2010 | Henrich et al. |

OTHER PUBLICATIONS

Milne et al., :MBMS Studies of HZSM-5 Activity During Wood Pyrolysis Product Conversion, Research in Thermochemical Biomass Conversion, pp. 910-926. ed. A.V. Bridgewater and J.L. Kuester, New York: Elsevier Applied Science Publishers, 1988.*

* cited by examiner

*Primary Examiner* — Jill Warden
(74) *Attorney, Agent, or Firm* — John D. Fado; Robert D. Jones; Lesley Shaw

(57) ABSTRACT

A pyrolyzer apparatus (i.e. a "cracking pipe") comprises a first screen, a second screen, and a catalyst material positioned between the first and second screens. The pyrolyzer is structured so that feedstock is pyrolyzed and pyrolyzer-generated gas is drawn through the first screen, through the catalyst material, and then through the second screen in series. The gas may then be directed to other processing equipment so that bio-oil is extracted from the gas.

14 Claims, 3 Drawing Sheets

FAST PYROLYSIS CATALYTIC CRACKING PIPE FOR PRODUCING BIO-OILS

FIELD OF THE INVENTION

The present invention relates to a method and apparatus for producing bio-oils. Specifically, the invention relates to a method and apparatus of producing catalytically treated fast pyrolysis bio-oils in quantities at least sufficient for analysis and aging studies.

BACKGROUND OF THE INVENTION

Fast pyrolysis is a thermochemical process that breaks down organic material into smaller vaporous molecules (both condensable and non-condensable) and solid charred material via rapid heating in the absence of oxygen. When the fast pyrolysis process is applied to a biomass feedstock, fast pyrolysis produces greater quantities of condensable gases (used to generate bio-oils) than more conventional gasification methods, which produce primarily non-condensable gases (i.e. syngas).

Fast pyrolysis of biomass is typically accomplished by exposing a biomass feedstock to temperatures between 450 and 550° C. in the absence of oxygen. During the fast pyrolysis process, the feedstock is transformed into combustible gases and biochar in an inert gas atmosphere that does not support combustion. The condensable gases are then cooled and recovered as a liquid (bio-oil). The heating rate is generally on the order of 1000° C./s. This is typically done in a fluidized bed or entrained gas reactor that is able to achieve the high heat transfer rates necessary for fast pyrolysis.

The bio-oils produced through the fast pyrolysis process are typically acidic and exhibit increased viscosity and average molecular weight with age. Considerable current research is devoted to investigating use of catalysts to deoxygenate bio-oils to increase bio-oil stability so that the bio-oil would be a suitable refinery feedstock for production of renewable transportation fuels. However, duplicating the conditions for fast pyrolysis on a scale suitable for screening catalysts is problematic. Commercially available micropyrolysis reactors can accomplish this duplication at the milligram level, but these reactors do not produce quantities of bio-oil necessary for comprehensive analysis and aging studies. Other attempts to scale down fast pyrolysis have used external feedstock heating processes, however, these process do not heat quickly enough.

The need exists for a pyrolysis method and apparatus that generates sufficient quantities of bio-oil for at least experimental investigation and analysis. The "catalytic cracking pipe" system of the current invention embodies the solution to many of the prior art process problems and generates high quality bio-oil in at least sufficient quantities for further research.

SUMMARY OF THE INVENTION

The current invention is directed to a pyrolyzer apparatus. The pyrolyzer apparatus comprises a first screen, a second screen, and a catalyst material positioned between the first and second screens. The pyrolyzer is structured so that feedstock is pyrolyzed and pyrolyzer-generated gas is drawn through the first screen, through the catalyst material, and then through the second screen in series. The gas may then be directed to other processing equipment so that bio-oil is extracted from the gas.

DETAILED DESCRIPTION OF PREFERRED EMBODIMENTS

Figure 1:
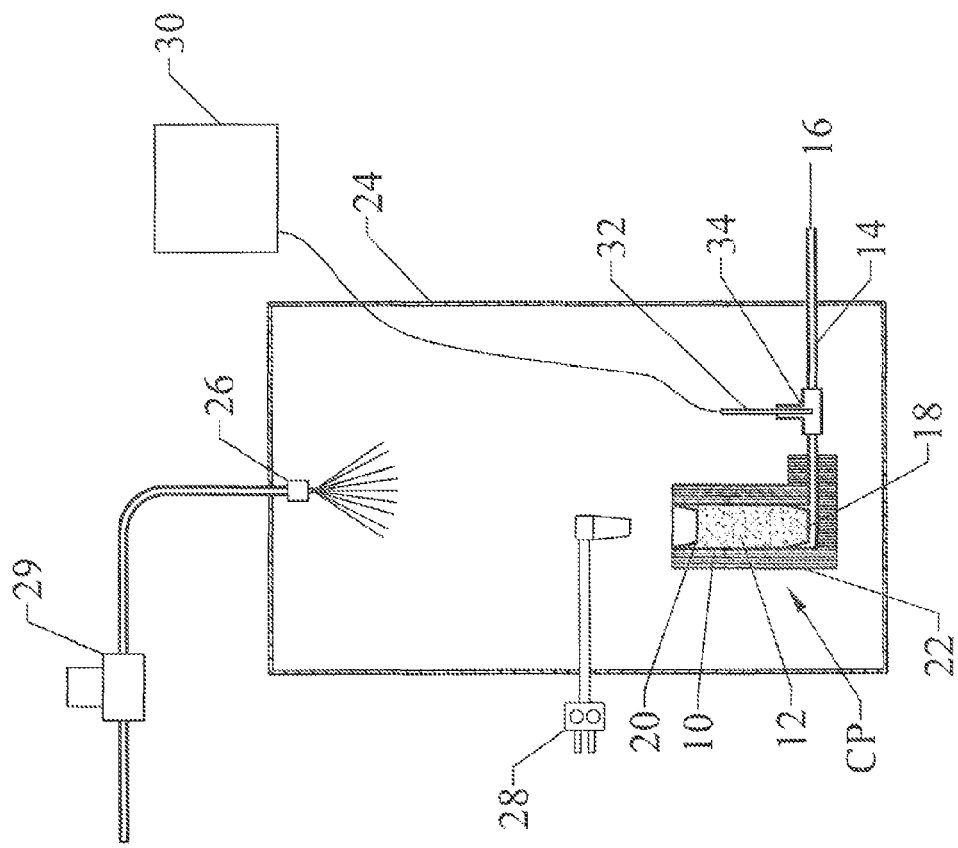
FIG. 1 is a schematic view of the cracking pipe of the current invention

The current invention comprises a fast pyrolysis method and apparatus. As generally shown in FIG. 1, the primary component of the apparatus is a "catalytic cracking pipe" CP. The apparatus is designated a catalytic cracking pipe because gasses generated by the pyrolysis process are drawn through a "pipe bowl" 10 filled with a catalyst 12, and then out of the bowl 10 through a (pipe) stem 14 in the direction of the arrow 16. The pyrolyzer-generated gas includes entrained char so that the visual physical appearance of the gas resembles conventional smoke.

In the preferred embodiment, the catalytic cracking pipe bowl 10 is tubular and generally vertical. The bowl 10 is about an inch and a half in diameter (at the top) and five inches high. A one quarter inch diameter tubular stem 14 extends horizontally from the bottom portion of the bowl 10. A first screen 20 is positioned near the top of the pipe bowl 10, and a second screen 18 is positioned near the base of the pipe bowl 10. The second screen 18 supports the catalyst 12 which is loosely packed in the pipe bowl 10 to a level about 1 inch below the top of the bowl 10. The first screen 20 supports the biomass feedstock (not shown) used in the pyrolysis process. The pipe bowl 10 is jacketed with an electric heater 22 to preheat the catalyst 12 to fast pyrolysis temperatures. In an alternative embodiment, the catalyst 12 in the pipe bowl 10 is mixed or intermingled with a biomass feedstock.

The pyrolysis process occurs in an inert gas atmosphere, primarily to prevent oxygen from contaminating the pyrolysis process. In the preferred embodiment, the inert gas comprises nitrogen although other (non-oxidizing) gases should be considered within the scope of the invention. A gas shroud 24 encloses the cracking pipe apparatus CP so that an inert atmosphere is maintained within the shroud 24. In the preferred embodiment, the shroud 24 is tubular and approximately twelve inches in diameter and twenty five inches in height. The inert gas is directed into the shroud 24 through a nozzle 26 in the top portion of the shroud 24. A gas regulator 29 controls the flow of gas into the shroud 24.

In the FIG. 1 representation, a proximal wall of the shroud 24 has been removed so that the cracking pipe CP and the other components in the interior of the shroud 24 are visible. In the preferred embodiment, a portal opening (not shown) in the wall of the shroud 24 allows access to the components in the interior of the shroud 24. A cover for the opening may be comprised of strips of insulating cloth or a resilient material or the like. The cover is designed to allow access to the inside the shroud 24, while simultaneously limiting the flow of inert gas out, and also precluding the entry of air into the shroud 24. The flow of inert gas into the shroud 24 is maintained at a rate sufficient to keep a slightly positive gas flow from the shroud 24 to ensure that air does not enter the shroud 24.

In the preferred embodiment, an oxyfuel torch 28 is used to directly heat the biomass feedstock in the cracking pipe CP. The oxyfuel torch 28 mixes fuel (acetylene) and oxygen internally, so that the torch 28 maintains a flame in the inert atmosphere of the shroud 24. The fuel mixture is kept either stoichiometric or slightly sub-stoichiometric in oxygen (carborizing) to ensure there is no combustible oxygen going into the cracking pipe CP. The torch 28 flame is applied to directly heat the biomass supported by the screen 20, thereby initiating the fast pyrolysis process. The heat transfer rate of the torch 28 to the biomass is in the range of fast pyrolysis.

In the prototype device, the torch 28 is manually manipulated over the biomass. However, in a production configuration, biomass feedstock is automatically metered and injected into the pyrolysis process through a feedstock injection system and the function of the torch 28 is controlled by a fuel control system operated in coordination with the feedstock injection system.

Figure 3:
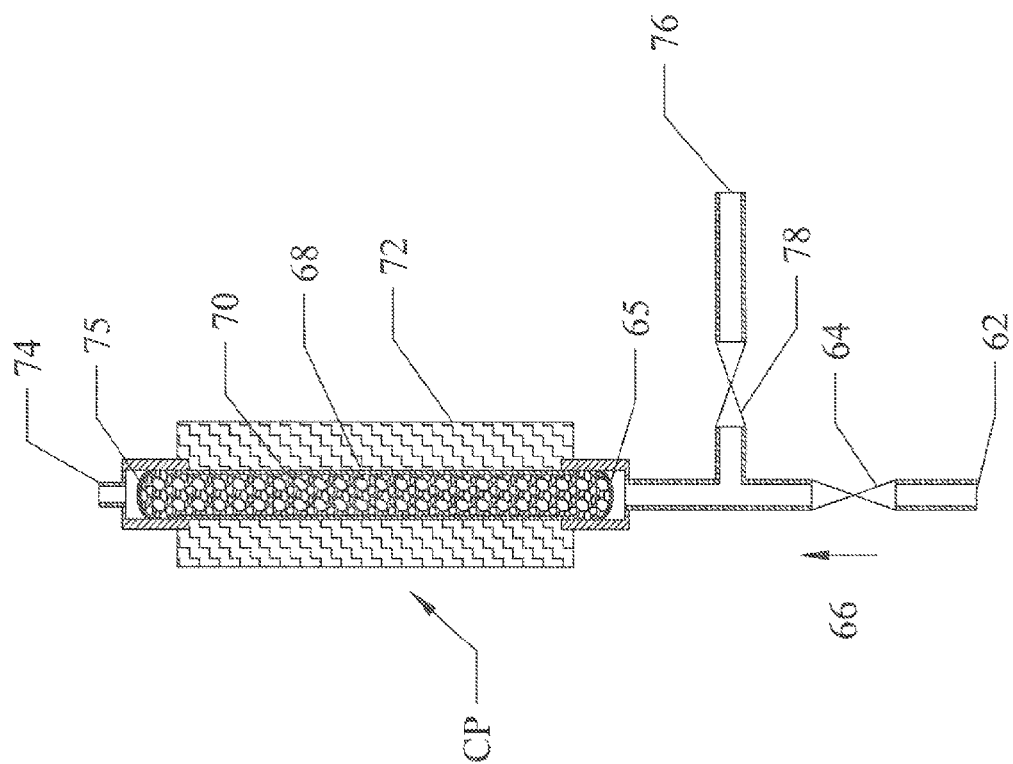
FIG. 3 is a sectional schematic of an alternative embodiment of the cracking pipe.

The flow of pyrolysis gasses out of the cracking pipe CP is modulated by a valve apparatus 34 in coordination with a vacuum source 46 (see FIG. 3). The valve apparatus 34 incorporates at least a thermocouple device 32 that is in communication with a temperature control system 30. The temperature control system 30 is at least in communication with the electrical heater jacket 22 that heats the pipe bowl 10, and may also communicate with the fuel control system that controls the oxyfuel torch 28. The valve apparatus 34 may comprise a manual valve or a controllable solenoid-type valve that is in communication with the temperature, fuel, and feedstock control systems.

Figure 2:
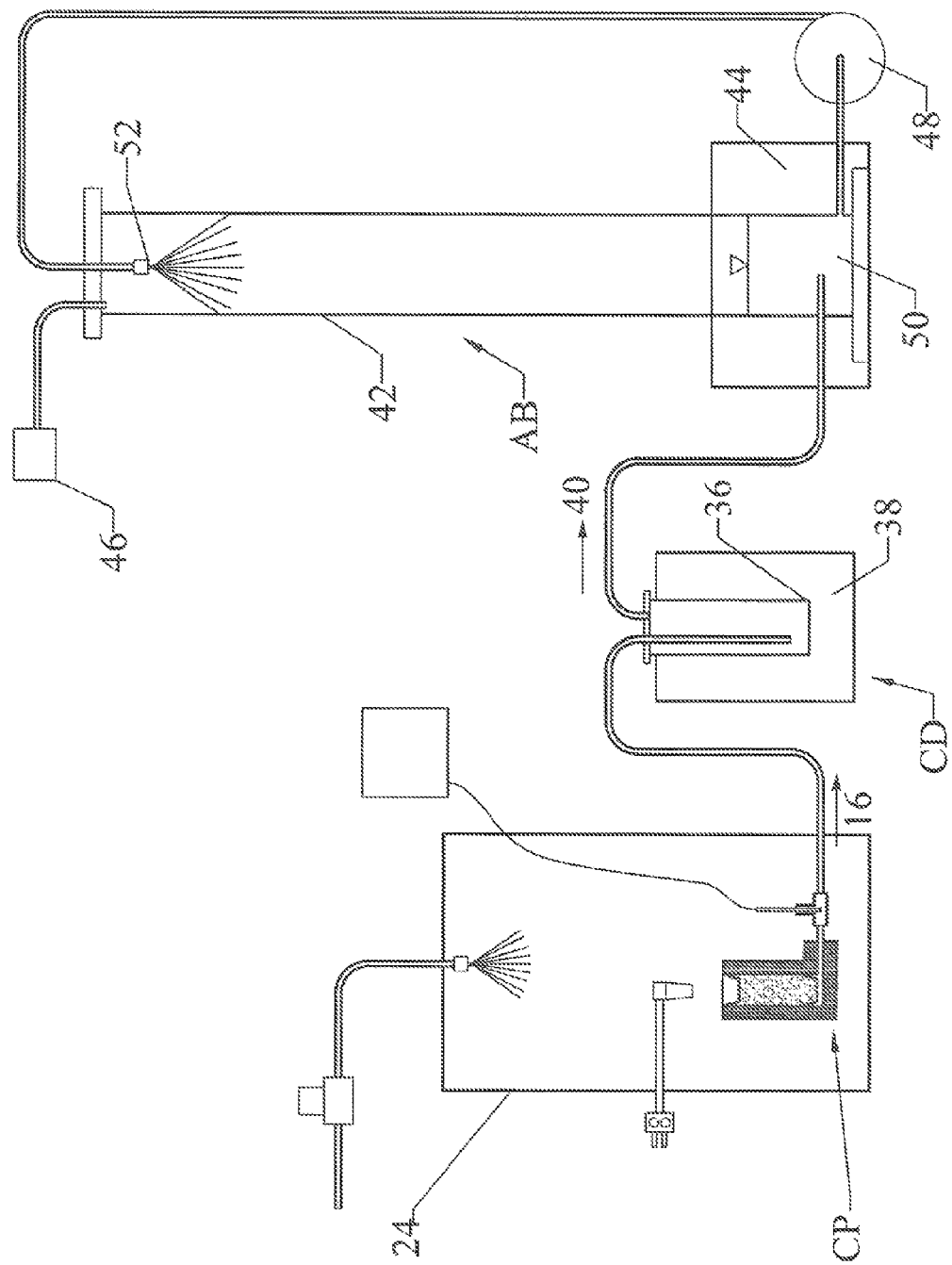
FIG. 2 is a schematic view of the cracking pipe connected to a condenser and an absorber.

As best shown in FIG. 2, after the pyrolysis gasses exit the cracking pipe shroud 24 in the direction of the arrow 16, they enter an impingement condenser CD. The impingement condenser CD is a simple single tube condenser 36 immersed in a cold bath 38, typically comprised of ice water (0° C.) or dry-ice/acetone (−78° C.). The condenser CD functions simply to cool the pyrolysis gases. After the gasses are circulated through the condenser CD they flow out of the condenser CD in the direction of the arrow 40 and into an absorber AB.

The absorber AB is primarily comprised of an absorber column 42. In the preferred embodiment, the absorber column 42 is a vertical and tubular vessel that is approximately 4 inches in diameter and 34 inches tall. The absorber column 42 is set in a cold bath 44, typically comprised of dry ice. The absorber fluid is primarily composed of liquids known to dissolve the components of bio-oil. Generally the absorber fluid comprises either ethanol or methanol because the product bio-oil is largely comprised of oxygenated organic compounds of varying polarity which dissolve well in alcohols.

As best shown in FIG. 2, as a vacuum source 46 draws the pyrolysis gasses away from the condenser CD and into the absorber column 42, a pump 48 circulates the absorber fluid from a reservoir 50 in the bottom of the column 42 through a spray nozzle 52 at the top of the column 42. The spray nozzle 52 creates a cloud of absorber fluid that absorbs the bio-oil component of the pyrolysis gasses so that the absorbed bio-oil also collects in the reservoir 50 in the bottom of the column 42.

When the fluid level in the column 42 reaches a pre-determined height, the accumulated absorber fluid and bio-oil mixture is circulated out of the reservoir 50 and into a separation means. The separation means (not shown) separates the bio-oil from the absorber fluid and then returns the absorber fluid to the reservoir 50.

FIG. 3 shows an alternative embodiment of the cracking pipe CP. In accordance with the FIG. 3 embodiment, pyrolysis (or gasification) is carried out using a prior art pyrolyzer and the pyrolyzer-generated gasses are directed into a cracking pipe inlet 62 controlled by an inlet valve 64. The pyrolyzer gasses are directed into the cracking pipe CP in the direction of the arrow 66. As described supra with regard to the preferred embodiment, in the FIG. 3 alternative embodiment the cracking pipe bowl 68 is tubular, vertically oriented, packed with catalyst 70, and surrounded by a heating jacket 72. Pyrolyzer gasses are drawn through a first screen 65 into the bowl 68, through the catalyst 70, through a second screen 75 and out an outlet 74.

The FIG. 3 alternative embodiment also includes an air (or alternative gas) injection portal 76 and an associated control valve 78. Air or other gasses may be injected into the cracking pipe CP to periodically clean and regenerate the catalyst material 70 and thereby improve the efficiency of the process. After the pyrolyzer gasses leave the cracking pipe CP they may be directed to the condenser CD and absorber AB of the preferred embodiment, or they may be directed to any other separation and/or refinement equipment known in the art.

Experimental Results

Control experiments were carried out prior to catalytic cracking runs to establish a baseline for comparison between catalytic and non-catalytic results. For example, a blank run was performed by holding the torch 28 to the catalyst 12 situated within the cracking pipe CP for a period of several minutes with no biomass present, while collecting vapors using the aforementioned condensation methods. In addition, biomass was pyrolyzed in the absence of the catalyst 12 using the cracking pipe CP and condensation CD and absorption AB equipment to further establish control parameters for product analysis.

Samples comprising approximately 25 grams of biomass were placed in the cracking pipe biomass screen 20. The torch 28 was used to pyrolyze the material and the bio-oil product was collected in the condenser CD cold condenser tube 36 and in the absorber AB reservoir 50. Successive samples were pyrolized (typically 20-25 samples) before the absorber fluid/bio-oil mixture was drained from the reservoir 50. The mixture was directed to a separation means (rotovap or similar device) where the absorber fluid was removed under reduced pressure leaving only the catalytically produced bio-oil. Low polarity compounds of interest (hydrocarbons) were separated from the absorber fluids by extraction with pentane or similar solvent. After analysis of the produced bio-oil, it was apparent that hydrocarbons characteristic of those found following employment of proven catalytic cracking methods, were present in the product.

For the foregoing reasons, it is clear that the invention provides an innovative bio-oil production method and apparatus. The invention may be modified in multiple ways and applied in various technological applications. The current invention may be modified and customized as required by a specific operation or application, and the individual components may be modified and defined, as required, to achieve the desired result.

Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A pyrolyzer system comprising:
 a bowl;
 a heater jacketing the bowl and heating the bowl to pyrolysis temperatures;
 a first screen positioned at or near a top of the bowl;
 a second screen positioned at or near a bottom of the bowl;
 a catalyst material positioned between the first and second screens, the first screen, the bowl, the heater, the catalyst, and the second screen comprising a cracking pipe, the cracking pipe further comprising a stem adjacent the bottom of the bowl; the stem being connected to a modulating means and a vacuum source; and, a feedstock and a means for pyrolyzing the feedstock, the feedstock being positioned on the first screen;

wherein the pyrolyzer system is structured so that, as the feedstock is pyrolyzed, gas generated by pyrolysis is drawn through the first screen, through the catalyst material, and then through the second screen in series, and into the stem.

2. The system of claim 1 wherein the system is structured so that the cracking pipe feedstock is pyrolyzed in an inert gas atmosphere adjacent to the first screen.

3. The system of claim 1 wherein the system is structured so that an inert gas atmosphere is maintained by a shroud disposed around the cracking pipe.

4. The system of claim 1 wherein system is structured so that the feedstock is directly heated by a torch.

5. The system of claim 4 wherein the torch is an oxyfuel torch positioned above the first screen.

6. The system of claim 1 wherein system is structured so that a flow of the gas through the cracking pipe is modulated by the modulating means and/or the vacuum source.

7. The system of claim 6 wherein the system is structured so that the cracking pipe is controlled by a temperature control system, the temperature control system monitoring the cracking pipe temperature through a thermocouple.

8. The system of claim 7 wherein the thermocouple is co-located with the modulating means.

9. The system of claim 1 further comprising a condenser, wherein the gas from the cracking pipe is directed to the condenser.

10. The system of claim 9 wherein the condenser comprises an impingement condenser, the impingement condenser comprising a single condenser tube immersed in a cold water bath.

11. The system of claim 1 further comprising an absorber, wherein the gas from the cracking pipe is directed to the absorber.

12. The system of claim 1 wherein the gas from the cracking pipe is directed through a condenser and then through an absorber.

13. The system of claim 11 wherein the absorber comprises an absorber column structured so that as the gas enters the absorber column, absorber fluid is sprayed into the absorber column so that a combination of absorber fluid and a product bio-oil collect in a reservoir associated with the absorber column.

14. The system of claim 1 wherein the modulating means comprises a manual valve or an automated solenoid valve.

* * * * *